United States Patent
Chen et al.

(10) Patent No.: US 10,582,391 B2
(45) Date of Patent: Mar. 3, 2020

(54) ANTENNA SYSTEM AND ANTENNA SYSTEM ADJUSTMENT METHOD

(71) Applicant: HUAWEI TECHNOLOGIES CO., LTD., Shenzhen, Guangdong (CN)

(72) Inventors: Xuehai Chen, Shanghai (CN); Yingjiu Xia, Shenzhen (CN); Qiang Wang, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/234,096

(22) Filed: Dec. 27, 2018

(65) Prior Publication Data

US 2019/0132742 A1 May 2, 2019

Related U.S. Application Data

(63) Continuation of application No. PCT/CN2017/089754, filed on Jun. 23, 2017.

(30) Foreign Application Priority Data

Jun. 29, 2016 (CN) .......................... 2016 1 0494490

(51) Int. Cl.
*H04W 40/00* (2009.01)
*H04W 16/04* (2009.01)
*H04W 16/10* (2009.01)

(52) U.S. Cl.
CPC ........... *H04W 16/04* (2013.01); *H04W 16/10* (2013.01)

(58) Field of Classification Search
None
See application file for complete search history.

(56) References Cited

U.S. PATENT DOCUMENTS

| 6,400,335 | B1* | 6/2002 | Weaver | H01Q 1/246 342/372 |
|---|---|---|---|---|
| 6,421,005 | B1* | 7/2002 | Weaver | H01Q 1/246 342/367 |
| 2009/0023477 | A1 | 1/2009 | Staudte | |
| 2009/0224995 | A1* | 9/2009 | Puente | H01Q 1/246 343/850 |
| 2014/0004791 | A1 | 1/2014 | Behrens et al. | |
| 2014/0057627 | A1 | 2/2014 | Hejazi et al. | |

(Continued)

FOREIGN PATENT DOCUMENTS

| CN | 103188713 A | 7/2013 |
|---|---|---|
| CN | 103188731 A | 7/2013 |
| CN | 104160725 A | 11/2014 |

(Continued)

*Primary Examiner* — Erika A Washington
(74) *Attorney, Agent, or Firm* — Womble Bond Dickinson (US) LLP

(57) ABSTRACT

The embodiments of the present disclosure provide an antenna system, including a barrel directional antenna array, a radio frequency transceiver, and a baseband signal processing and control unit. Based on the barrel directional antenna array, the antenna system can adjust the quantity of sectors in a 360-degree range based on a change in a service volume in the 360-degree sector, so that an adjusted sector service capacity threshold can accommodate the service volume in the 360-degree sector. In this way, resource scheduling flexibility is improved.

12 Claims, 6 Drawing Sheets

(56) References Cited

U.S. PATENT DOCUMENTS

2015/0146591 A1    5/2015  Das

FOREIGN PATENT DOCUMENTS

| CN | 104335622 | A  | 2/2015  |
| CN | 106211174 | A  | 12/2016 |
| CN | 104335622 | B  | 5/2018  |
| EP | 1184937   | A1 | 3/2002  |
| EP | 2800424   | B1 | 7/2017  |
| WO | 2012123361| A1 | 9/2012  |

* cited by examiner

ANTENNA SYSTEM AND ANTENNA SYSTEM ADJUSTMENT METHOD

CROSS-REFERENCE TO RELATED APPLICATIONS

This application is a continuation of International Application No. PCT/CN2017/089754, filed on Jun. 23, 2017, which claims priority to Chinese Patent Application No. 201610494490.4, filed on Jun. 29, 2016. The disclosures of the aforementioned applications are hereby incorporated by reference in their entireties.

TECHNICAL FIELD

The present disclosure relates to the communications field, and in particular, to an antenna system and an antenna system adjustment method.

BACKGROUND

With development of mobile broadband (MBB) services, a mobile network user requires an increasingly higher bandwidth rate. In a case of a limited spectrum, many technologies for improving spectrum utilization efficiency emerge. The technologies include a multiple-input multiple-output (MIMO) technology, a multi-antenna array technology, and an adaptive antenna system (AAS).

In the prior art, the multi-antenna array technology and the AAS system use a panel multi-column antenna array. A single panel multi-antenna array cannot implement full horizontal 360-degree coverage, and horizontal 360-degree coverage can be implemented only by using a plurality of antenna arrays that point to different orientations.

In the prior art, a single panel multi-antenna array can cover only a single sector (usually covering 120 degrees horizontally), and a quantity of sectors cannot be adjusted in horizontal 360 degrees based on user quantity distribution and a required-service volume. Therefore, resource scheduling is not flexible enough.

SUMMARY

Embodiments of the present disclosure provide an antenna system and an antenna system adjustment method, so that a quantity of sectors can be adjusted in a 360-degree range based on a barrel directional antenna array and a change in a service volume in a 360-degree sector, to improve resource scheduling flexibility.

In view of this, a first aspect of the present disclosure provides an antenna system, including:

a barrel directional antenna array, a radio frequency transceiver, and a baseband signal processing and control unit, where the barrel directional antenna array is formed by M directional antenna arrays, and horizontally covers a 360-degree sector, and M is an integer greater than or equal to 3;

the radio frequency transceiver sends and receives service data by using the barrel directional antenna array; and the baseband signal processing and control unit is configured to perform the following steps:

obtaining a first service volume in the 360-degree sector, where a quantity of sectors in the 360-degree sector is a first sector quantity;

determining a second sector quantity based on the first service volume; and dividing the 360-degree sector based on the second sector quantity.

Optionally, the baseband signal processing and control unit is further configured to perform the following steps:

if the first service volume is greater than a sector service capacity threshold for the first sector quantity, increasing the first sector quantity to the second sector quantity; or if the first service volume is less than a sector service capacity threshold for the first sector quantity, reducing the first sector quantity to the second sector quantity.

Optionally, the baseband signal processing and control unit is further configured to perform the following step:

dividing the M directional antenna arrays in the barrel directional antenna array based on the second sector quantity.

Optionally, the baseband signal processing and control unit is further configured to perform the following steps:

obtaining a second service volume in a target sector, where the target sector belongs to the 360-degree sector divided based on the second sector quantity; and adjusting a quantity of directional antenna arrays in the target sector based on the second service volume.

Optionally, the baseband signal processing and control unit is further configured to perform the following step:

if interference between the target sector and a neighboring sector is greater than a first threshold, allocating a same resource block and a same cell number to a common channel of the target sector and a common channel of the neighboring sector, and allocating an independent resource block to a service channel of the target sector and a service channel of the neighboring sector.

A second aspect of the present disclosure provides an antenna system adjustment method, where the method is applied to a barrel directional antenna array, the barrel directional antenna array is formed by M directional antenna arrays, and horizontally covers a 360-degree sector, M is an integer greater than or equal to 3, and the antenna system adjustment method includes:

obtaining a first service volume in the 360-degree sector, where a quantity of sectors in the 360-degree sector is a first sector quantity;

determining a second sector quantity based on the first service volume; and dividing the 360-degree sector based on the second sector quantity.

In this embodiment, based on the barrel directional antenna array, an antenna system can adjust the quantity of sectors in a 360-degree range based on a change in a service volume in the 360-degree sector, so that an adjusted sector service capacity threshold can accommodate the service volume in the 360-degree sector. In this way, resource scheduling flexibility is improved.

Optionally, the determining a second sector quantity based on the first service volume includes:

if the first service volume is greater than a sector service capacity threshold for the first sector quantity, increasing the first sector quantity to the second sector quantity; or if the first service volume is less than a sector service capacity threshold for the first sector quantity, reducing the first sector quantity to the second sector quantity.

In this embodiment, based on the barrel directional antenna array, the antenna system can increase the quantity of sectors in a 360-degree range based on an increase in the service volume in the 360-degree sector, and can reduce the quantity of sectors based on a decrease in the service volume in the 360-degree sector, so that an increased or reduced sector service capacity threshold can adapt to the first service volume. In this way, resource scheduling flexibility is improved.

Optionally, the dividing the 360-degree sector based on the second sector quantity includes:

dividing the M directional antenna arrays in the barrel directional antenna array based on the second sector quantity.

In this embodiment, the antenna system evenly divides the M directional antenna arrays among all sectors based on the second sector quantity, to evenly allocate directional antenna array resources in the 360-degree sector. Alternatively, the antenna system may unevenly divide the M directional antenna arrays among all sectors based on different service volumes in the sectors.

Optionally, after the dividing the 360-degree sector based on the second sector quantity, the method further includes:

obtaining a second service volume in a target sector, where the target sector belongs to the 360-degree sector divided based on the second sector quantity; and adjusting a quantity of directional antenna arrays in the target sector based on the second service volume.

In this embodiment, when the service volume in the target sector increases, the antenna system can increase a quantity of directional antenna arrays in the target sector. An added directional antenna array preferentially comes from a sector whose service volume decreases. In addition, if the sector whose service volume decreases is not adjacent to the target sector, the antenna system can add, to a middle sector separating the target sector from the sector whose service volume decreases, a directional antenna array from the sector whose service volume decreases; and correspondingly reduces a quantity of directional antenna arrays in the middle sector, and adds, to the target sector, a directional antenna array subtracted from the middle sector, thereby implementing flexible configuration of directional antenna arrays in sectors.

Optionally, the method further includes:

if interference between the target sector and a neighboring sector is greater than a first threshold, allocating a same resource block and a same cell number to a common channel of the target sector and a common channel of the neighboring sector, and allocating an independent resource block to a service channel of the target sector and a service channel of the neighboring sector.

In this embodiment, the antenna system allocates the same resource block and the same cell number to the common channel of the target sector and the common channel of the neighboring sector, and allocates the independent resource block to the service channel of the target sector and the service channel of the neighboring sector, so that communication interference between neighboring sectors can be effectively reduced, and spatial multiplexing of a spectrum resource can be implemented.

It can be learned from the foregoing technical solutions that the embodiments of the present disclosure have the following advantages:

In the embodiments of the present disclosure, the antenna system is based on the barrel directional antenna array formed by the M directional antenna arrays, the barrel directional antenna array horizontally covers the 360-degree sector, and M is an integer greater than or equal to 3. The antenna system may obtain the first service volume in the 360-degree sector, where the quantity of sectors in the 360-degree sector is the first sector quantity in this case; and determine the second sector quantity based on the first service volume. The antenna system can re-divide the 360-degree sector based on the second sector quantity. It can be learned that, based on the barrel directional antenna array, the antenna system can adjust the quantity of sectors in the 360-degree range based on the change in the service volume in the 360-degree sector, so that the adjusted sector service capacity threshold can accommodate the service volume in the 360-degree sector. In this way, resource scheduling flexibility is improved.

DESCRIPTION OF EMBODIMENTS

Embodiments of the present disclosure provide an antenna system and an antenna system adjustment method, so that a quantity of sectors can be adjusted in a 360-degree range based on a barrel directional antenna array and a change in a service volume in a 360-degree sector, to improve resource scheduling flexibility.

In the specification, claims, and accompanying drawings of the present disclosure, the terms "first", "second", "third", "fourth", and the like (if any) are intended to distinguish between similar objects, but do not necessarily indicate a specific order or sequence. It should be understood that the terms used in such a way are interchangeable in proper circumstances, so that the embodiments of the present disclosure described herein can be, for example, implemented in other orders than the order illustrated or described herein. Moreover, the terms "include", "contain" and any other variants mean to cover the non-exclusive inclusion, for example, a process, method, system, product, or device that includes a series of steps or units is not necessarily limited to those expressly listed steps or units, but may include other steps or units not expressly listed or inherent to such a process, method, product, or device.

Figure 1:
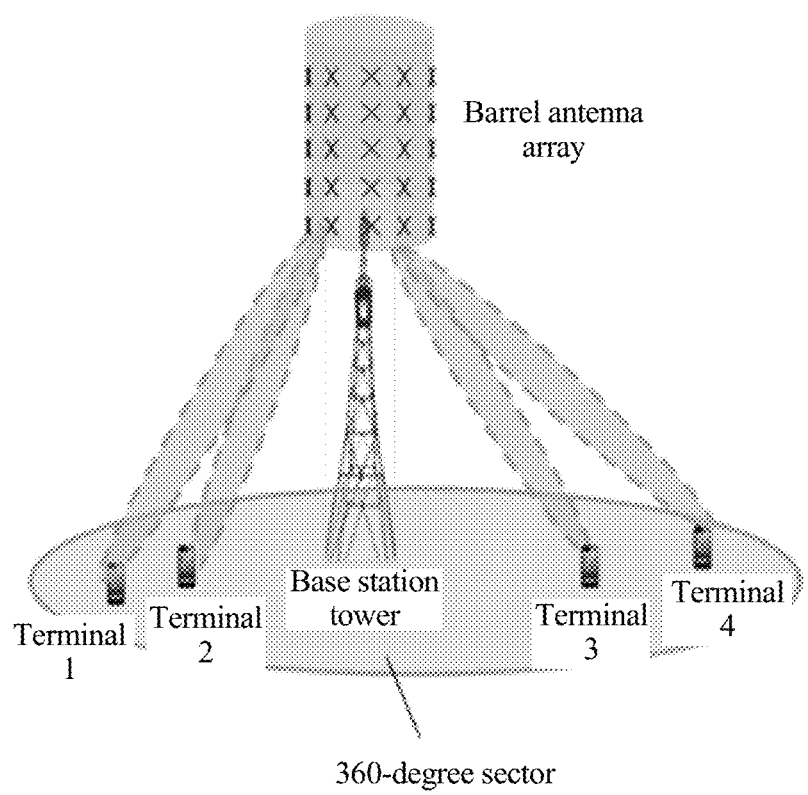
FIG. 1 is a schematic diagram of an application scenario of a barrel directional antenna array according to an embodiment of the present disclosure.

It should be understood that the present disclosure is applied to a barrel directional antenna array, and the barrel directional antenna array can cover a 360-degree sector. Referring to FIG. 1, FIG. 1 is a schematic diagram of an application scenario of a barrel directional antenna array according to an embodiment of the present disclosure. As shown in FIG. 1, the barrel directional antenna array may be mounted on a base station tower, or may be mounted on another high-rise building. The barrel directional antenna array may cover a 360-degree sector, and may send and receive service data in a 360-degree sector range. For example, as shown in FIG. 1, the barrel directional antenna array may communicate with a terminal 1, a terminal 2, a terminal 3, and a terminal 4.

Figure 2:
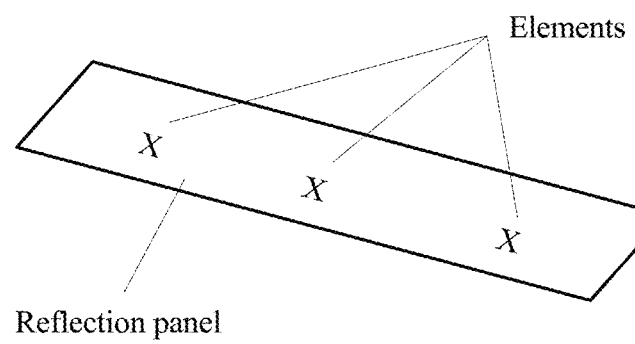
FIG. 2 is a schematic diagram of a directional antenna array structure according to an embodiment of the present disclosure.

The barrel directional antenna array may be formed by M directional antenna arrays that form a bucket shape, and M is an integer greater than or equal to 3. In addition, a directional antenna array in the distributed M directional antenna arrays may be shown in FIG. 2. Referring to FIG. 2, the directional antenna array may include N elements and one reflection panel, and N is a positive integer. In FIG. 2, three elements are used as an example for description, but this does not constitute a limitation on the present disclosure. In this embodiment of the present disclosure, the barrel directional antenna array may be formed by M directional antenna arrays that are connected to form a bucket shape, or may include a barrel reflection panel formed through one-time casting and M columns of elements on the reflection panel. This is not specifically limited herein.

Figure 3:
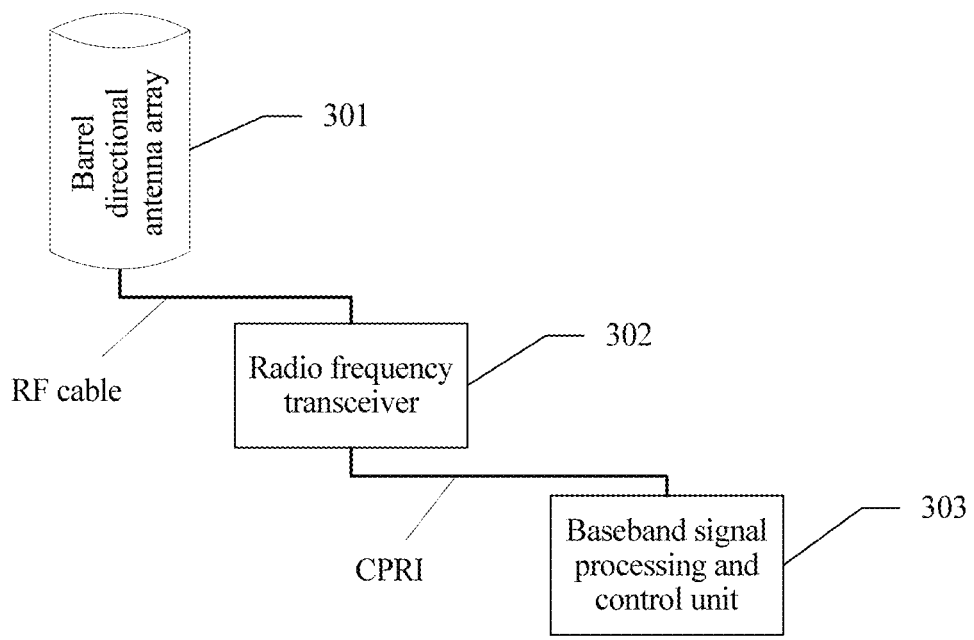
FIG. 3 is a schematic diagram of an antenna system entity apparatus according to an embodiment of the present disclosure.

The following describes an antenna system in this embodiment of the present disclosure based on the barrel directional antenna array. Referring to FIG. 3, an embodiment of an antenna system according to an embodiment of the present disclosure includes:

a barrel directional antenna array 301, a radio frequency transceiver 302, and a baseband signal processing and control unit 303 (there may be one or more radio frequency transceivers 302, and one radio frequency transceiver 302 is used as an example in FIG. 3; and there may be one or more baseband signal processing and control units 303, and one baseband signal processing and control unit 303 is used as an example in FIG. 3). In some embodiments of the present disclosure, the barrel directional antenna array 301 may be connected to the radio frequency transceiver 302 by using a radio frequency cable, and the radio frequency transceiver 302 may be connected to the baseband signal processing and control unit 303 by using an optical fiber. It may be understood that, in this embodiment of the present disclosure, the barrel directional antenna array 301 may be connected to the radio frequency transceiver 302 by using another connection cable in addition to the radio frequency cable. Likewise, the radio frequency transceiver 302 may be connected to the baseband signal processing and control unit 303 by using another connection cable in addition to the optical fiber. This is not specifically limited herein.

In this embodiment, the barrel directional antenna array 301 may be formed by M directional antenna arrays, and the M directional antenna arrays may be perpendicular to a horizontal plane, and can horizontally cover a 360-degree sector. M is an integer greater than or equal to 3.

In this embodiment, the radio frequency transceiver 302 may be a radio frequency module (or Radio Unit, RU). The radio frequency transceiver 302 and the barrel directional antenna array 301 may be connected by using a radio frequency (RF) cable, and the radio frequency transceiver 302 may send and receive service data by using the barrel directional antenna array 301.

Figure 5:
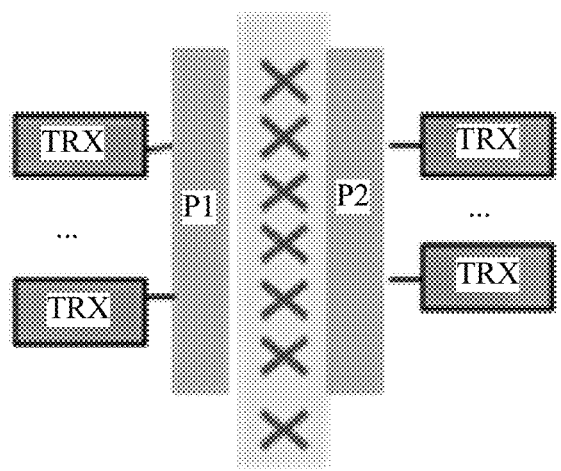
FIG. 5 is another schematic diagram of a connection between a radio frequency transceiver and a directional antenna array according to an embodiment of the present disclosure.

Optionally, in this embodiment, as shown in FIG. 5, each polarization direction in a perpendicular direction of the M directional antenna arrays in the barrel directional antenna array 301 may be corresponding to one transceiver (TRX), and a radio frequency transceiver (TRX) in the figure is the radio frequency transceiver 302. In addition, P1 and P2 shown in FIG. 5 may be power division networks.

Figure 6:
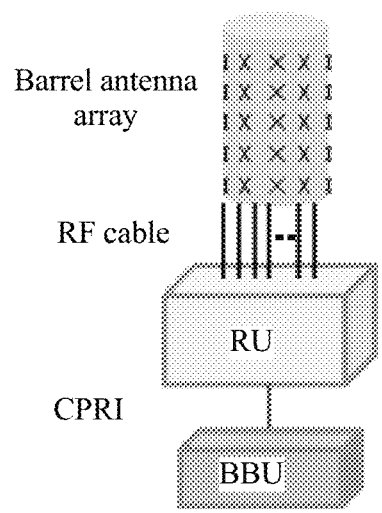
FIG. 6 is a schematic diagram of a hardware architecture of an antenna system according to an embodiment of the present disclosure.

Optionally, in this embodiment, as shown in FIG. 6, a same column of elements in a perpendicular direction of the M directional antenna arrays in the barrel directional antenna array 301 may be corresponding to a plurality of transceivers (TRXs), and a radio frequency transceiver (TRX) in the figure is the radio frequency transceiver 302. In addition, P1 and P2 shown in FIG. 6 may also be power division networks.

In this embodiment, the radio frequency transceiver 302 and the baseband signal processing and control unit 303 may be connected by using a common public radio interface (CPRI), to transmit service data. The baseband signal processing and control unit 303 may be a baseband processing module (or Base Band Unit, BBU).

In this embodiment, the baseband signal processing and control unit 303 is configured to perform the following steps:

obtaining a first service volume in the 360-degree sector, where a quantity of sectors in the 360-degree sector is a first sector quantity;

determining a second sector quantity based on the first service volume; and dividing the 360-degree sector based on the second sector quantity.

In this embodiment, the baseband signal processing and control unit 303 is further configured to perform the following step:

if the first service volume is greater than a sector service capacity threshold for the first sector quantity, increasing the first sector quantity to the second sector quantity; or if the first service volume is less than a sector service capacity threshold for the first sector quantity, reducing the first sector quantity to the second sector quantity.

In this embodiment, the baseband signal processing and control unit 303 is further configured to perform the following step:

dividing the M directional antenna arrays in the barrel directional antenna array based on the second sector quantity. In this embodiment, the baseband signal processing and control unit 303 is further configured to perform the following steps:

obtaining a second service volume in a target sector, where the target sector belongs to the 360-degree sector divided based on the second sector quantity; and adjusting a quantity of directional antenna arrays in the target sector based on the second service volume.

In this embodiment, the baseband signal processing and control unit 303 is further configured to perform the following step:

if interference between the target sector and a neighboring sector is greater than a first threshold, allocating a same resource block and a same cell number to a common channel of the target sector and a common channel of the neighboring sector, and allocating an independent resource block to a service channel of the target sector and a service channel of the neighboring sector.

In this embodiment, in addition to a horizontal sector, the antenna system may adjust a vertical sector based on a service requirement. This is not specifically limited herein.

In this embodiment, the barrel directional antenna array 301 is formed by the M directional antenna arrays, the barrel directional antenna array 301 horizontally covers the 360-degree sector, and M is an integer greater than or equal to 3. The baseband signal processing and control unit 303 may obtain the first service volume in the 360-degree sector, where the quantity of sectors in the 360-degree sector is the first sector quantity in this case; and determine the second sector quantity based on the first service volume. The baseband signal processing and control unit 303 can re-divide the 360-degree sector based on the second sector quantity. It can be learned that, based on the barrel directional antenna array, the baseband signal processing and control unit 303 can adjust the quantity of sectors in a 360-degree range based on a change in a service volume in the 360-degree sector, so that an adjusted sector service capacity threshold can accommodate the service volume in the 360-degree sector. In this way, resource scheduling flexibility is improved.

Optionally, on the basis of the foregoing embodiment corresponding to FIG. 3, an example in which the radio frequency transceiver 302 is a radio frequency module (RU) and the baseband signal processing and control unit 303 is a baseband processing module (BBU) is used. A hardware architecture of an antenna system according to an embodiment of the present disclosure may include: Referring to FIG. 6, in an embodiment of a hardware architecture of an antenna system according to an embodiment of the present disclosure, the barrel directional antenna array and the radio frequency module (RU) may be discrete, and the radio frequency module (RU) may be connected to the barrel directional antenna array by using a radio frequency cable (RF) cable.

In addition, the radio frequency module (RU) and the baseband processing module (BBU) may be connected by using a common public radio interface (CPRI).

Figure 7:
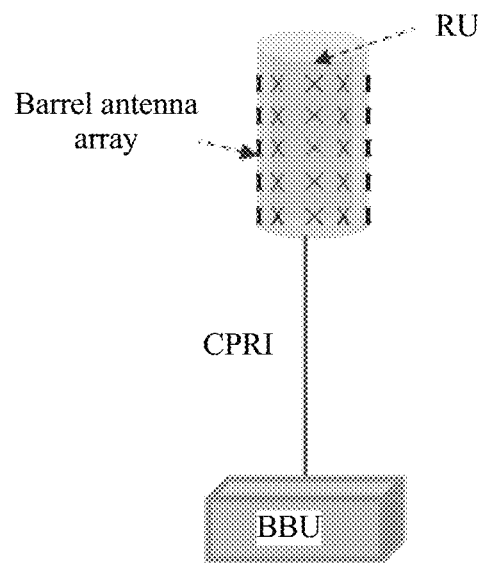
FIG. 7 is another schematic diagram of a hardware architecture of an antenna system according to an embodiment of the present disclosure.

Optionally, on the basis of the foregoing embodiment corresponding to FIG. 3, an example in which the radio frequency transceiver 302 is a radio frequency module (RU) and the baseband signal processing and control unit 303 is a baseband processing module (BBU) is used. A hardware architecture of an antenna system according to an embodiment of the present disclosure may further include: Referring to FIG. 7, in another embodiment of a hardware architecture of an antenna system according to an embodiment of the present disclosure, the barrel directional antenna array may be integrated with the radio frequency module (RU). To be specific, the radio frequency module (RU) may be built in the barrel directional antenna array for implementing integration, and specifically, may be built in a middle or lower part of the barrel directional antenna array.

The radio frequency module (RU) and the barrel directional antenna array may also be connected by using a radio frequency (RF) cable.

In addition, the radio frequency module (RU) and the baseband processing module (BBU) may also be connected by using a common public radio interface (CPRI).

Figure 4:
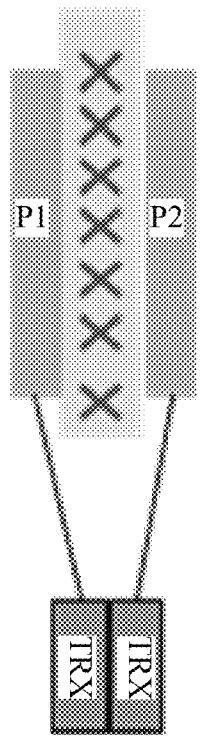
FIG. 4 is a schematic diagram of a connection between a radio frequency transceiver and a directional antenna array according to an embodiment of the present disclosure.

Different from the hardware architecture of the antenna system in the embodiment shown in FIG. 4, in the embodiment shown in FIG. 5, a design of integrating the barrel directional antenna array with the radio frequency module (RU) may implement economical use of space.

Figure 8:
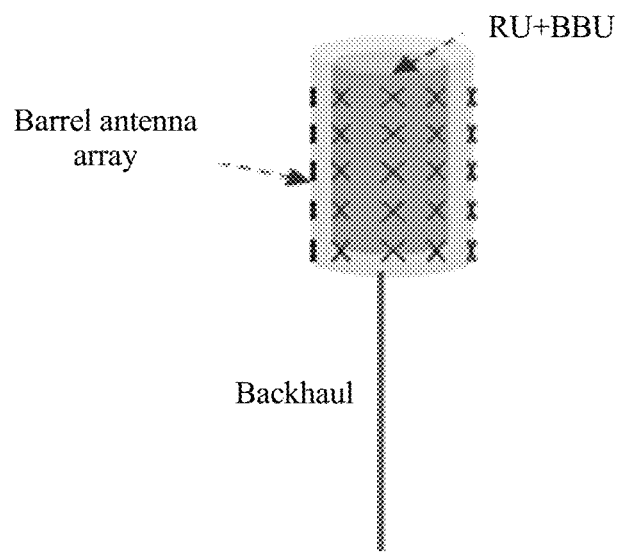
FIG. 8 is another schematic diagram of a hardware architecture of an antenna system according to an embodiment of the present disclosure.

Optionally, on the basis of the foregoing embodiment corresponding to FIG. 3, an example in which the radio frequency transceiver 302 is a radio frequency module (RU) and the baseband signal processing and control unit 303 is a baseband processing module (BBU) is used. A hardware architecture of an antenna system according to an embodiment of the present disclosure may further include: Referring to FIG. 8, in another embodiment of a hardware architecture of an antenna system according to an embodiment of the present disclosure, the barrel directional antenna array may be integrated with the radio frequency module (RU) and the baseband processing module (BBU). To be specific, the radio frequency module (RU) and the baseband processing module (BBU) may be built in the barrel directional antenna array for implementing integration.

The radio frequency module (RU) and the barrel directional antenna array may also be connected by using a radio frequency (RF) cable. In addition, the radio frequency module (RU) and the baseband processing module (BBU) may also be connected by using a common public radio interface (CPRI).

In this embodiment, the antenna system may be connected to a base station controller by using a backhaul line.

In the embodiment shown in FIG. 6, a design of integrating the barrel directional antenna array with the radio frequency module (RU) and the baseband processing module (BBU) may further implement economical use of space.

The antenna system in the present disclosure is described above, and the following describes an antenna system adjustment method for the antenna system in the present disclosure. It should be noted that the antenna system adjustment method is applied to a barrel directional antenna array. The barrel directional antenna array is formed by M directional antenna arrays, and horizontally covers a 360-degree sector, and M is an integer greater than or equal to 3.

Figure 9:
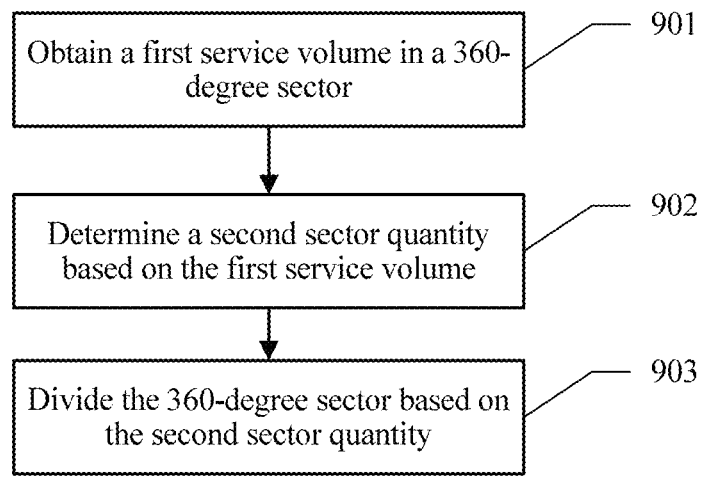
FIG. 9 is a schematic diagram of an embodiment of an antenna system adjustment method according to an embodiment of the present disclosure.

Referring to FIG. 9, an embodiment of an antenna system adjustment method according to an embodiment of the present disclosure includes the following steps.

901. Obtain a first service volume in a 360-degree sector.

In this embodiment, an antenna system may obtain a first service volume in a 360-degree sector horizontally covered by a barrel directional antenna array. The first service volume may include a quantity of user terminals (or User Equipment, UE) distributed in the 360-degree sector, and may further include a required-service volume of UE in the 360-degree sector. This is not specifically limited herein.

In this embodiment, the first service volume obtained by the antenna system may be one or a combination of more of network key performance indicators (KPIs). The network KPIs include a user quantity, a total throughput rate, an average user throughput rate, a TOP 5% user peak rate, user experience, and the like.

Figure 10:
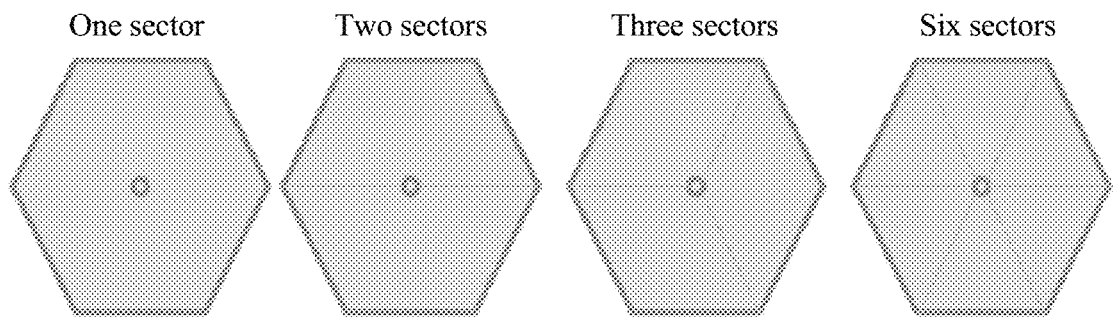
FIG. 10 is a schematic diagram of dividing sectors by an antenna system according to an embodiment of the present disclosure.

It should be noted that, when the antenna system obtains the first service volume in the 360-degree sector, a quantity of sectors obtained by dividing the 360-degree sector may be a first sector quantity. For example, as shown in FIG. 10, the antenna system may determine the 360-degree sector, and divide the 360-degree sector into one sector, two sectors, three sectors, six sectors, or the like.

It may be understood that the first sector quantity may be a default quantity of sectors initially divided by the antenna system, and the default quantity of sectors may depend on an operation policy of an operator to which the antenna system belongs. This is not specifically limited herein.

It may be understood that the antenna system may set a time period to periodically obtain a second service volume in a target sector. The time period may depend on an operation policy of the operator to which the antenna system belongs.

902. Determine a second sector quantity based on the first service volume.

In this embodiment, the antenna system may determine the second sector quantity based on the first service volume. The antenna system may compare the first service volume with a value of a sector service capacity threshold for the first sector quantity by which the 360-degree sector is divided. The sector service capacity threshold for the first sector quantity may be a maximum volume of services that can be carried when the antenna system divides the 360-degree sector into the first sector quantity of sectors, and the sector service capacity threshold may also depend on an operation policy of the operator to which the antenna system belongs.

In this embodiment, the first service volume may be one or a combination of more of network KPIs. The network KPIs include a user quantity, a total throughput rate, an average user throughput rate, a TOP 5% user peak rate, user experience, and the like. It may be understood that the sector service capacity threshold for the first sector quantity may also be one or a combination of more of the network KPIs.

In this embodiment, the user quantity in the network KPIs is used as an example. The user quantity may include a user quantity in a radio resource control (RRC) connected state, or may include a user quantity in a radio access bearer (RAB) active state. The RRC connected state is a radio resource control (RRC) connection established between the antenna system and UE, and the RAB active state is a radio access bearer (RAB) connection established between the antenna system and the UE.

If the antenna system learns, through calculation, that the first service volume is greater than the sector service capacity threshold for the first sector quantity, the antenna system may increase the first sector quantity to the second sector quantity. If the antenna system learns, through calculation, that the first service volume is less than the sector service capacity threshold for the first sector quantity, the antenna system may reduce the first sector quantity to the second sector quantity. It may be understood that a sector service capacity threshold for the second sector quantity may be greater than or equal to the first service volume.

It should be understood that a sector service volume for the second sector quantity to which the antenna system increases or reduces the first sector quantity can meet the first service volume.

903. Divide the 360-degree sector based on the second sector quantity.

Figure 11:
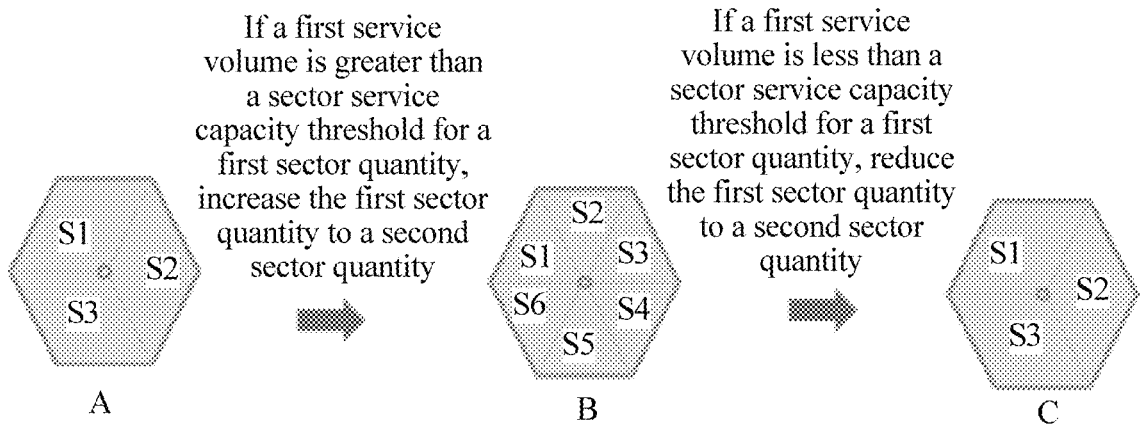
FIG. 11 is another schematic diagram of dividing sectors by an antenna system according to an embodiment of the present disclosure.

In this embodiment, the antenna system may divide the 360-degree sector based on the determined second sector quantity. As shown in FIG. 11, it is assumed that the first sector quantity is 3, as shown in A in FIG. 11. When the antenna system learns, through calculation, that the first service volume is greater than the sector service capacity threshold for the first sector quantity, in an example of a user quantity in an RRC connected state, the sector service capacity threshold for the first sector quantity is 300, and the first service volume is 600, the antenna system may divide the 360-degree sector into six sectors, in other words, the second sector quantity is 6, as shown in B in FIG. 11.

In this embodiment, it is assumed that the first sector quantity is 6, as shown in B in FIG. 11. When the antenna system learns, through calculation, that the first service volume is less than the sector service capacity threshold for the first sector quantity, in an example of a user quantity in an RRC connected state, the sector service capacity threshold for the first sector quantity is 600, and the first service volume is 300, the antenna system may divide the 360-degree sector into three sectors, in other words, the second sector quantity is 3, as shown in C in FIG. 11.

Optionally, in this embodiment, when the antenna system divides the 360-degree sector based on the second sector quantity, the M directional antenna arrays in the barrel directional antenna array may be evenly divided among all sectors. It is assumed that the second sector quantity is X. In this case, the antenna system may allocate M/X directional antenna arrays to each sector for working, where M/X may be a positive integer. It may be understood that, alternatively, the antenna system may unevenly divide the M directional antenna arrays based on different quantities of UEs distributed in the 360-degree sector. This is not specifically limited herein.

In this embodiment, in addition to a horizontal sector, the antenna system may adjust a vertical sector based on a service requirement. This is not specifically limited herein.

In this embodiment, the antenna system is based on the barrel directional antenna array formed by the M directional antenna arrays, the barrel directional antenna array horizontally covers the 360-degree sector, and M is an integer greater than or equal to 3. The antenna system may obtain the first service volume in the 360-degree sector, where the quantity of sectors in the 360-degree sector is the first sector quantity in this case; and determine the second sector quantity based on the first service volume. The antenna system can re-divide the 360-degree sector based on the second sector quantity. It can be learned that, based on the barrel directional antenna array, the antenna system can adjust the quantity of sectors in a 360-degree range based on a change in a service volume in the 360-degree sector, so that an adjusted sector service capacity threshold can accommodate the service volume in the 360-degree sector. In this way, resource scheduling flexibility is improved.

Figure 12:
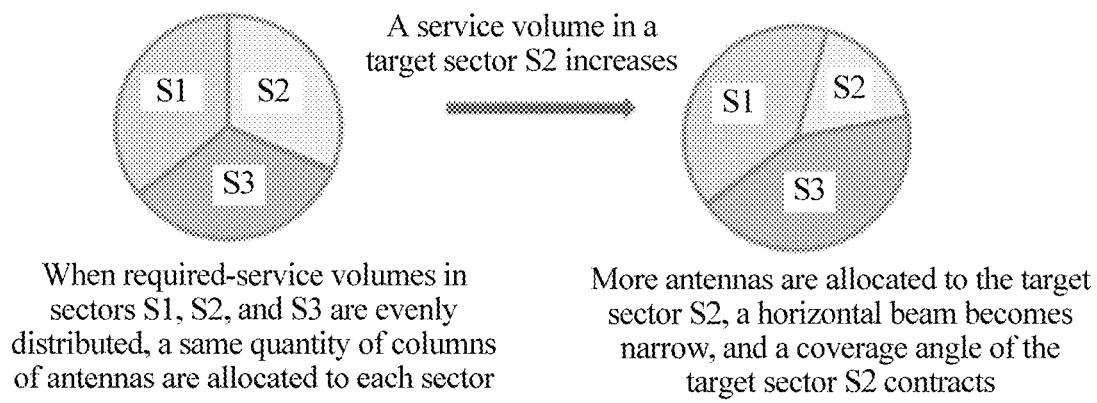
FIG. 12 is a schematic diagram of adjusting a quantity of directional antenna arrays in a target sector by an antenna system according to an embodiment of the present disclosure.

Optionally, on the basis of the embodiment shown in FIG. 9, in this embodiment of the present disclosure, after dividing the 360-degree sector covered by the barrel directional antenna array, the antenna system may further adjust a quantity of directional antenna arrays in the target sector based on a change in a service volume in the target sector in sectors obtained through division. As shown in FIG. 12, in an embodiment shown in FIG. 12, an example in which the antenna system divides the 360-degree sector based on the second sector quantity is used.

It is assumed that the second sector quantity is 3, and the antenna system evenly divides the 360-degree sector into three sectors: a sector S1, a sector S2, and a sector S3. The sector S1, the sector S2, and the sector S3 each include M/3 directional antenna arrays. It should be understood that M/3 is a positive integer.

If the sector S2 is a target sector, the antenna system may obtain a second service volume in the target sector. The antenna system may set a time period to periodically obtain the second service volume in the target sector. The time period may depend on an operation policy of the operator to which the antenna system belongs.

In this embodiment, as shown in FIG. 12, if the second service volume in the target sector (the sector S2) is greater than a current sector service capacity threshold of the sector S2, the antenna system may reduce a quantity of directional antenna arrays in the sector S1, and add, to the sector S2, a directional antenna array subtracted from the sector S1. Alternatively, the antenna system may reduce a quantity of directional antenna arrays in the sector S3, and add, to the sector S2, a directional antenna array subtracted from the sector S3. Alternatively, the antenna system may reduce a quantity of directional antenna arrays in each of the sector S1 and the sector S3, and add, to the sector S2, a directional antenna array subtracted from each of the sector S1 and the sector S3. This is not specifically limited herein.

It should be understood that the second service volume may also be one or a combination of more of network KPIs. The network KPIs may include a user quantity, user distribution, a total throughput rate, and the like. The sector service capacity threshold of the sector S2 may also be one or a combination of more of the network KPIs.

It should be noted that, in this embodiment, if a service volume in the sector S1 decreases, the antenna system may preferentially reduce the directional antenna arrays in the sector S1, and add, to the sector S2, the directional antenna array subtracted from the sector S1.

It should be noted that a sector service volume in the sector S2 after the quantity of directional antenna arrays is increased can meet the second service volume.

In this embodiment, based on an electromagnetic wave interference principle, directional antenna arrays serving the sector S2 are increased, so that an electromagnetic wave beam sent by the directional antenna arrays in the sector S2 aims at a center, a horizontal beam becomes narrow, and a coverage angle of the directional antenna arrays contracts, such as the sector S2 shown in FIG. 12.

It should be noted that, this embodiment is also applicable to a scenario in which service volumes in sectors in the 360-degree sector covered by the barrel directional antenna array in the antenna system are unevenly distributed, and details are not described herein.

Optionally, based on the embodiment shown in FIG. 9, in this embodiment of the present disclosure, the antenna system may preferentially allocate an independent resource block (RB) to each sector obtained through dividing the 360-degree sector. If communication interference between two neighboring sectors reaches a first threshold, the first threshold may be set, based on an operation policy, by the operator to which the antenna system belongs.

Figure 13:
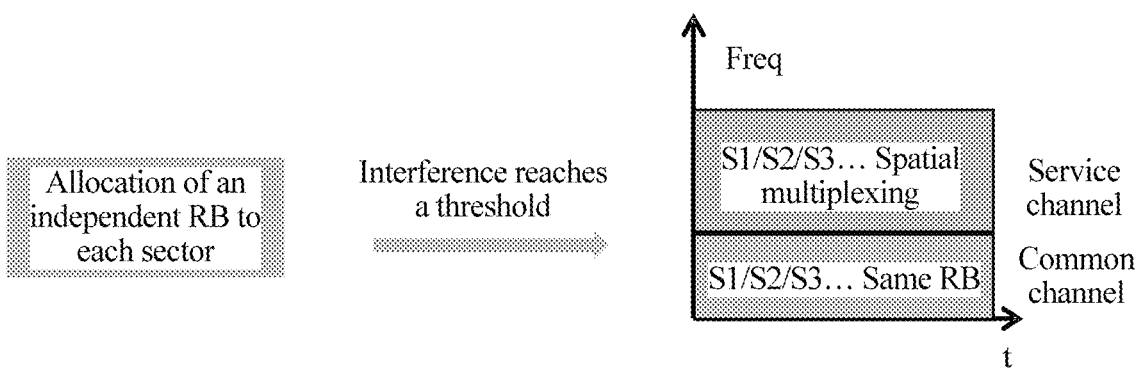
FIG. 13 is a schematic diagram of reducing communication interference between neighboring sectors by an antenna system according to an embodiment of the present disclosure.

In this embodiment, to reduce communication interference between neighboring sectors and simplify a relationship between the neighboring sectors, an inter-sector frequency resource sharing and allocation mechanism for common channels and service channels shown in FIG. 13 may be used in a Long Term Evolution (LTE) eNodeB. The neighboring sectors may be, for example, S1, S2, and S3, and a same RB and a same cell number may be used for common channels of the neighboring sectors, and independent RBs may be used for service channels, to implement spatial multiplexing of a spectrum.

It should be noted that, if the communication interference between the neighboring sectors is less than the threshold, a resource allocation mechanism for allocating an independent RB to each sector is restored.

It should be understood that the communication interference between the neighboring sectors may be determined based on one or a combination of more of the following network KPIs: an average user throughput rate, a TOP 5% user peak rate, user experience, and the like.

It may be clearly understood by persons skilled in the art that, for the purpose of convenient and brief description, for a detailed working process of the system, apparatus, and unit described above, refer to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. An antenna system, comprising:
a barrel directional antenna array, a radio frequency transceiver, and a baseband signal processing and control unit, wherein
the barrel directional antenna array is formed by M directional antenna arrays, and horizontally covers a 360-degree sector, and M is an integer greater than or equal to 3;
the radio frequency transceiver sends and receives service data by using the barrel directional antenna array; and
the baseband signal processing and control unit is configured to perform the following operations:
obtaining a first service volume in the 360-degree sector, wherein a quantity of sectors in the 360-degree sector is a first sector quantity;
determining a second sector quantity based on the first service volume;
dividing the 360-degree sector based on the second sector quantity; and
if interference between a target sector and a neighboring sector is greater than a first threshold, the target sector and the neighboring sector belonging to the 360-degree sector divided based on the second sector quantity, allocating a same resource block and a same cell number to a common channel of the target sector and a common channel of the neighboring sector, and allocating an independent resource block to a service channel of the target sector and a service channel of the neighboring sector.

2. The antenna system according to claim 1, wherein the baseband signal processing and control unit is further configured to perform the following operation:
if the first service volume is greater than a sector service capacity threshold for the first sector quantity, increasing the first sector quantity to the second sector quantity; or if the first service volume is less than a sector service capacity threshold for the first sector quantity, reducing the first sector quantity to the second sector quantity.

3. The antenna system according to claim 1, wherein the baseband signal processing and control unit is further configured to perform the following operation:
dividing the M directional antenna arrays in the barrel directional antenna array based on the second sector quantity.

4. The antenna system according to claim 3, wherein the baseband signal processing and control unit is further configured to perform the following operations:
obtaining a second service volume in the target sector; and
adjusting a quantity of directional antenna arrays in the target sector based on the second service volume.

5. An antenna system adjustment method, wherein the method is applied to a barrel directional antenna array, the barrel directional antenna array is formed by M directional antenna arrays, and horizontally covers a 360-degree sector, M is an integer greater than or equal to 3, and the method comprises:
obtaining a first service volume in the 360-degree sector, wherein a quantity of sectors in the 360-degree sector is a first sector quantity;
determining a second sector quantity based on the first service volume;
dividing the 360-degree sector based on the second sector quantity; and
if interference between a target sector and a neighboring sector is greater than a first threshold, the target sector and the neighboring sector belonging to the 360-degree sector divided based on the second sector quantity, allocating a same resource block and a same cell number to a common channel of the target sector and a common channel of the neighboring sector, and allocating an independent resource block to a service channel of the target sector and a service channel of the neighboring sector.

6. The antenna system adjustment method according to claim 5, wherein the determining a second sector quantity based on the first service volume further comprises:
if the first service volume is greater than a sector service capacity threshold for the first sector quantity, increasing the first sector quantity to the second sector quantity; or if the first service volume is less than a sector service capacity threshold for the first sector quantity, reducing the first sector quantity to the second sector quantity.

7. The antenna system adjustment method according to claim 6, wherein the dividing the 360-degree sector based on the second sector quantity further comprises:
dividing the M directional antenna arrays in the barrel directional antenna array based on the second sector quantity.

8. The antenna system adjustment method according to claim 7, further comprising:
after the dividing the 360-degree sector based on the second sector quantity, obtaining a second service volume in the target sector; and
adjusting a quantity of directional antenna arrays in the target sector based on the second service volume.

9. A non-transitory computer-readable medium comprising code which, when executed by a processor, causes the processor to perform antenna system adjustment operations, comprising:
obtaining a first service volume in a 360-degree sector of a barrel directional antenna array, wherein a quantity of sectors in the 360-degree sector is a first sector quantity;
determining a second sector quantity based on the first service volume;
dividing the 360-degree sector based on the second sector quantity, wherein the barrel directional antenna array is formed by M directional antenna arrays, and horizontally covers the 360-degree sector, and wherein M is an integer greater than or equal to 3; and
if interference between a target sector and a neighboring sector is greater than a first threshold, the target sector and the neighboring sector belonging to the 360-degree sector divided based on the second sector quantity, allocating a same resource block and a same cell number to a common channel of the target sector and a common channel of the neighboring sector, and allocating an independent resource block to a service channel of the target sector and a service channel of the neighboring sector.

10. The non-transitory computer-readable medium according to claim 9, wherein the determining a second sector quantity based on the first service volume further comprises:
if the first service volume is greater than a sector service capacity threshold for the first sector quantity, increasing the first sector quantity to the second sector quantity; or if the first service volume is less than a sector service capacity threshold for the first sector quantity, reducing the first sector quantity to the second sector quantity.

11. The non-transitory computer-readable medium according to claim 10, wherein the dividing the 360-degree sector based on the second sector quantity further comprises:
dividing the M directional antenna arrays in the barrel directional antenna array based on the second sector quantity.

12. The non-transitory computer-readable medium according to claim 11, the operations further comprising:
after the dividing the 360-degree sector based on the second sector quantity, obtaining a second service volume in the target sector; and
adjusting a quantity of directional antenna arrays in the target sector based on the second service volume.

* * * * *